Aug. 21, 1923.
W. A. NELSON
1,465,310
PROCESS FOR THE FIXATION OF ATMOSPHERIC NITROGEN
Filed Nov. 16, 1922
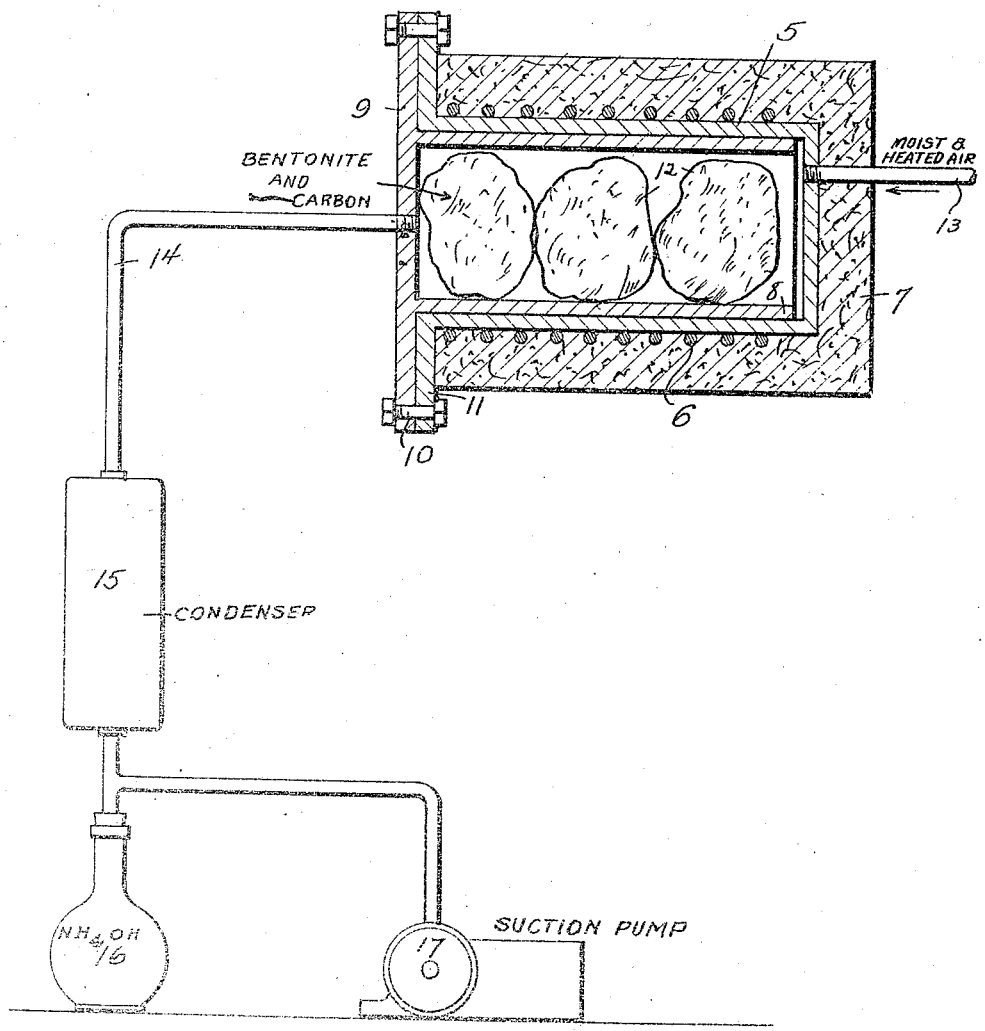

Patented Aug. 21, 1923.

1,465,310

UNITED STATES PATENT OFFICE.

WILBUR A. NELSON, OF NASHVILLE, TENNESSEE.

PROCESS FOR THE FIXATION OF ATMOSPHERIC NITROGEN.

Application filed November 16, 1922. Serial No. 601,291.

*To all whom it may concern:*

Be it known that I, WILBUR A. NELSON, a citizen of the United States of America, residing at Nashville, in the county of Davidson and State of Tennessee, have invented certain new and useful Improvements in Processes for the Fixation of Atmospheric Nitrogen, of which the following is a specification, reference being had therein to the accompanying drawings.

This invention relates to a process for obtaining nitrogen from the air in the form of ammonium hydroxide ($NH_4OH$).

Broadly stated the invention contemplates passing a current of air, which is preferably, though not necessarily, moist and heated, through a closed electric furnace which contains carbon and a complex hydrous aluminum silicate in the form of a clay. Preferably the clay and carbon are intimately mixed before being placed in the furnace. By means of the furnace the carbon and clay are heated to a point above that at which the water of constitution is driven off and I prefer to employ temperatures of from 500° to 1200° C. The air drawn through the furnace and the gases formed in it are then passed through a condenser which condenses the water vapor, the latter having absorbed the ammonia which is finally delivered in the form of ammonium hydroxide.

I have practiced the foregoing invention in the following way:

A mixture of bentonite and gas carbon reduced to a plastic form by the addition of water was shaped to form balls or a cylindrical roll and in such form was placed in an iron electric furnace and heated to 1000° C. Moist heated air was drawn through the furnace from the beginning of the heating and until the temperature had reached the maximum point and the gases and air drawn from the furnace were passed through a condenser and condensed. The recovery of the ammonium hydroxide was continuous after the temperature reached approximately 500° C. and up to the point of maximum temperature employed.

In the accompanying drawing I have diagrammatically illustrated an apparatus by which the invention may be practiced.

In this drawing 5 designates the shell or body of a furnace having an electric heating coil 6 wound externally thereon. This coil and shell are enclosed in a jacket 7 of insulating material. A sleeve 8 fits snugly within the shell 5 and is provided with a cap or head 9 adapted to be secured by screws 10, to a flange 11 of shell 5. The charge of mixed bentonite and carbon is indicated at 12. An inlet pipe 13 delivers moist and heated air to the furnace and an outlet pipe 14 conducts this air and the gases generated in the furnace to any suitable type of condenser 15. Preferably this is a conventional water cooled condenser. Any suitable type of receptacle, indicated at 16, may be disposed in position to receive the ammonium hydroxide from the condenser. A suitable suction pump, indicated at 17, maintains a circulation of the moist and heated air through the apparatus.

The bentonite referred to and which I have found of particular utility in the practice of the invention described, is a clay formed by the altering of a bed of volcanic ash and has as its chief mineral constituent leverrierite. "The mineral leverrierite swells in water and breaks up into a doughy mass. It is distinctly crystalline and in plates. It is soft, sectile and clay-like. It has an index of refraction of $\epsilon$ of about 1.57, birefringence of about 0.02, a very small axial angle and is optically negative in character. The acute bisectrix is sensibly normal to the plates. These are the characteristic properties of leverrierite." (Quoted from an article by E. S. Larsen and Edgar T. Wherry, entitled "Leverrierite from Colorado," in volume 7, No. 8, pages 208 to 214, of the Journal of the Washington Academy of Science.)

While I prefer to use bentonite it is to be understood that the invention includes within its purview the use of such other clays and carbonaceous materials as may be found suitable for the purpose. For example, I contemplate the use of powdered wood charcoal, powdered coke or flake or amorphous graphite and I also contemplate employing bauxite, ball clay or kaolin or any bentonitic or aluminum silicate containing hydroscopic water or water of constitution, which cannot be driven off at less than 200° C.

Having described my invention, what I claim is:

1. The herein described process which consists of heating a mass of clay and carbon, passing a current of moist air in contact therewith thereby forming ammonia and condensing the water vapor which absorbs the ammonia whereby ammonium hydroxide is recovered.

2. The herein described process which consists of heating a mass of bentonite and carbon to a temperature between 500° C. and 1000° C. passing a current of moist air in contact therewith thereby forming ammonia and condensing the water vapor which has absorbed the ammonia to thereby recover ammonium hydroxide.

3. The herein described process which consists of passing a current of moist air in contact with a mass of bentonite and carbon heated to a temperature where ammonia is formed and condensing the water vapor which has absorbed the ammonia to thereby recover ammonium hydroxide.

4. The herein described process which consists of enclosing a mass composed of bentonitic clay and a carbonaceous material in intimate mixture in a furnace and heating the same and passing over said heated mass a current of moist air.

5. The herein described process which consists of passing a current of moist air over a mass of aluminum silicate heated to a point at which ammonia is formed and condensing the water vapor which has absorbed the ammonia to thereby recover ammonium hydroxide.

6. The herein described process which consists of heating a mass composed of a bentonitic clay and a carbonaceous material in intimate mixture to between 500° C. and 1000° C., passing over said mass a current of moist and heated air and condensing the water vapor to recover ammonium hydroxide.

7. The herein described process which consists of heating a mass composed of aluminum silicate containing water of constitution and a carbonaceous material, in intimate mixture, to between 500° C. and 1000° C. and passing over said mass a current of moist air and then condensing the water vapor to recover ammonium hydroxide.

In testimony whereof I hereunto affix my signature.

WILBUR A. NELSON.